Oct. 16, 1923.
S. M. BELLRINGER
REAMER
Filed Dec. 6. 1921
1,470,679
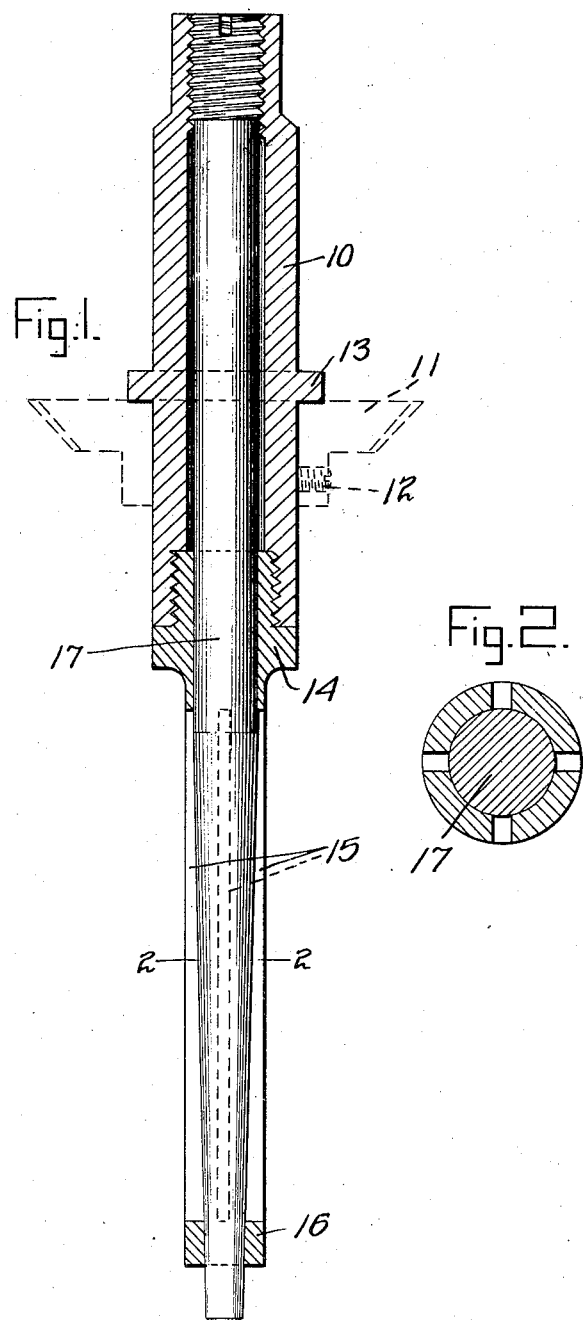
Inventor
Sidney M. Bellringer
By
Attorney Patented Oct. 16, 1923.

1,470,679

UNITED STATES PATENT OFFICE.

SIDNEY M. BELLRINGER, OF WAYNESBORO, PENNSYLVANIA, ASSIGNOR TO WAYNE TOOL MANUFACTURING COMPANY, OF WAYNESBORO, PENNSYLVANIA, A CORPORATION OF PENNSYLVANIA.

REAMER.

Application filed December 6, 1921. Serial No. 520,404.

*To all whom it may concern:*

Be it known that I, SIDNEY M. BELLRINGER, a subject of the King of Great Britain, residing at Waynesboro, in the county of Franklin and State of Pennsylvania, have invented certain new and useful Improvements in Reamers, of which the following is a specification.

My said invention relates to a centering device or pilot for valve seat reamers and it is an object of the same to provide in a device of the character described means for quick and accurate adjustment to cause the same to fit in a valve stem hole or other analogous location and insure accurate positioning of the operating tool and certainty of accurate operation.

Referring to the accompanying drawings which are made a part hereof and on which similar reference characters indicate similar parts, Figure 1 is an elevation partly in section, and Figure 2 is a horizontal section on line 2—2 of Figure 1.

In the drawings 10 indicates the shank of a reamer carrying a tool 11 held in place by a set screw 12. This shank is hollow and screw threaded at its upper and lower ends. At an intermediate point it has an annular flange 13 forming a stop for the tool.

Secured to the lower end by engagement with the lower screw thread is an elongated hollow extension 14 having slits 15 extending nearly the entire length thereof, here shown as four in number. At the lower end of the extension is an unslitted portion forming an integral collar 16.

An expansion member 17 extends through the central openings of shank 10 and extension 14, this member being adjustably secured to the upper screw thread of the shank. The central opening of the extension is tapered and the expansion member has a corresponding taper, the opening in the collar 16 having sufficient clearance to permit substantial longitudinal movement of the expansion member.

In operation the pilot 14 is placed in a valve stem hole or similar opening and the member 17 is adjusted to spring out the sides of the pilot to fit closely in the opening. The greatest expansion will be near the center of the pilot which is, however, spaced far enough from the tool to insure satisfactory performance of its centering function.

While I have shown a preferred form of my invention I do not limit myself either to the specific construction or the use described as other tools can be used therewith and various modifications and details can be made without departing from the scope of my invention as indicated in the appended claims.

Having thus fully described my said invention, what I claim as new and desire to secure by Letters Patent, is:

1. A tool holder having a shank and an expansible pilot, means engaging said pilot and adjustable to expand the same and means at the rear end of the shank whereby the adjusting means can be actuated, substantially as set forth.

2. A tool holder having a shank and a hollow longitudinally slotted pilot, and means in the pilot adjustable to expand the same and means at the rear end of the shank for operating the adjusting means, substantially as set forth.

3. A tool holder comprising a shank, a longitudinally slotted pilot at its forward end having a tapered axial opening and a correspondingly tapered adjusting member engaging said axial opening for varying the circumference of the pilot, and means for moving the adjusting member said means being accessible from the rear of the tool holder without removing the tool from the work, substantially as set forth.

4. A tool holder comprising a hollow shank internally threaded at both ends, a hollow slotted internally tapered pilot secured to the lower end of the shank, an expansion member threaded to the upper end of the shank and having a taper corresponding to that of the opening in the pilot, substantially as set forth.

5. A tool holder comprising a shank, a seat to limit upward movement of the tool, a longitudinally slotted extension at the lower end of the shank, said shank and extension being hollow and the hollow in the extension tapering toward the lower end, an expansion member extending from the upper end of the shank through said extension, and means at the upper end of the shank provided for longitudinal adjustment of the expansion member, substantially as set forth.

In witness whereof, I have hereunto set my hand and seal at Waynesboro, Pennsylvania this 3rd day of December, A. D. nineteen hundred and twenty-one.

SIDNEY M. BELLRINGER. [L. S.]

Witnesses:
  WM. H. STRAUSS,
  R. H. FRANTZ.